United States Patent
Levey (10) Patent No.: US 6,789,586 B2
(45) Date of Patent: Sep. 14, 2004

(54) BREAKAWAY CAPLESS REFUELING ASSEMBLY

(75) Inventor: Kenneth R. Levey, West Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/360,696

(22) Filed: Feb. 7, 2003

(65) Prior Publication Data

US 2003/0121563 A1 Jul. 3, 2003

Related U.S. Application Data

(63) Continuation-in-part of application No. 10/001,272, filed on Nov. 20, 2001, now Pat. No. 6,539,990.

(51) Int. Cl.[7] .................................................. B65B 1/04
(52) U.S. Cl. ................ 141/350; 220/86.2; 220/DIG. 33
(58) Field of Search ................................ 141/301, 302, 141/349, 350; 220/86.2, DIG. 33; 137/588

(56) References Cited

U.S. PATENT DOCUMENTS

| | | | |
|---|---|---|---|
| 5,056,570 A | 10/1991 | Harris et al. .................. 141/59 |
| 5,071,018 A | 12/1991 | Moore ........................ 220/86.2 |
| 5,145,081 A | 9/1992 | Gravino ...................... 220/86.2 |
| 5,271,438 A | 12/1993 | Griffin et al. .................. 141/59 |
| 5,282,497 A | 2/1994 | Allison ......................... 141/59 |
| 5,467,621 A | * 11/1995 | Gravino ........................ 70/171 |
| 5,538,055 A | 7/1996 | Kunz et al. ................. 141/312 |
| 5,730,194 A | 3/1998 | Foltz .......................... 141/301 |
| 5,732,840 A | 3/1998 | Foltz .......................... 220/86.2 |
| 6,009,920 A | 1/2000 | Palvoelgyi et al. ......... 141/348 |
| 6,035,906 A | * 3/2000 | Ott .............................. 141/312 |
| 6,092,685 A | 7/2000 | Gruber ...................... 220/86.2 |
| 6,155,316 A | 12/2000 | Benjey ....................... 141/348 |
| 6,189,581 B1 | 2/2001 | Harris et al. ................ 141/348 |
| 6,302,170 B1 | * 10/2001 | Ott .............................. 141/312 |
| 6,443,195 B2 | * 9/2002 | Palvoelgyi et al. ......... 141/350 |
| 6,446,826 B1 | * 9/2002 | Foltz et al. ................. 220/86.2 |

* cited by examiner

Primary Examiner—Steven O. Douglas
(74) Attorney, Agent, or Firm—Mark W. Croll; Paul F. Donovan (57) ABSTRACT

A cover structure is provided for the end of a fuel system filler tube. The cover structure includes a closure mechanism that opens and closes as a refueling nozzle is inserted or removed. The cover structure is attached to the filler tube assembly by frangible connections, and will separate from the filler tube assembly in the event of a crash.

36 Claims, 7 Drawing Sheets

BREAKAWAY CAPLESS REFUELING ASSEMBLY

CROSS-REFERENCE TO RELATED APPLICATION

This application is a continuation-in-part of U.S. application Ser. No. 10/001,272 filed on Nov. 20, 2001 now U.S. Pat. No. 6,539,990.

FIELD OF THE INVENTION

The present invention relates to fuel systems for motor vehicles, and, more specifically, to a capless refueling assembly at the end of a filler tube, which assembly opens and closes automatically upon insertion and removal of a fuel dispensing nozzle, and has break-away features in the event of a collision, promoting continued vehicle fuel system integrity.

BACKGROUND OF THE INVENTION

Vehicle fuel systems commonly include a fuel tank and a filler tube through which fuel is dispensed into the tank. A removable cap is provided at the end of the filler tube, to close the tube. Heat, movement of the vehicle and the like can cause a build-up of vapor pressure in the fuel tank. Under some conditions, vapor and/or fuel droplets can be discharged from the neck of the filler tube, as the cap is removed from the end of the filler tube. In addition to the unpleasant side affects from being sprayed with fuel and/or vapor, a person can be placed in danger from fire or explosion of the highly volatile substances.

It is known to provide a positive sealing insert, or PSI, in the end of the filler tube, to vent vapors that accumulate in the tank. The PSI includes a valve that functions to limit back flow of fuel into the outermost area of the filler tube, if the fuel sloshes up the filler tube during operation of the vehicle. A removable fuel cap commonly covers the end of the filler tube, and the cap provides a barrier against dirt or other contaminants from reaching the PSI and fouling the operation thereof, as well as providing a primary fuel shutoff.

Several problems have been experienced with known designs of refueling assemblies. Fuel caps can be lost, and the replacement thereof is often forgotten after refueling is complete. It is known to attach the fuel cap to the vehicle using a flexible tether strap secured to the housing surrounding the filler tube, to prevent loss of the cap. Tether straps used in the past have been relatively short, and some individuals find the strap to be awkward and interfering as the fuel cap is replaced. Further, the nature of such straps has been such as to require the strap and cap to be held out of the way with one hand while the refueling nozzle is inserted into the filler tube with the other hand. These factors can make a refueling operation awkward and slow for many people, but especially for some elderly individuals and others having physical limitations.

While a tether strap may prevent loss of the cap, it does not ensure that the cap will be replaced each time refueling is completed. Without replacement of the cap, or with improper replacement of the cap, the closure system is not complete. Dirt and contaminants can enter the filler tube, potentially fouling the PSI, and interfering with proper operation and function thereof. It is also possible for the tether strap to fail, resulting in an unconnected cap, and again raising the potential for the cap to be lost or forgotten during a refueling procedure.

Capless systems have been proposed in the past. Many such systems are complex and costly. Some are confusing and difficult to use, requiring training or instruction in the proper use thereof. Others may not protect adequately the intricate parts of the refueling system from dust or grime that will interfere with proper operation.

Another problem associated with refueling assemblies of vehicle fuel systems involves the accumulation of liquids in the housing surrounding the end of the filler tube. Many embody a cavity or chamber in which the end of the tube and the fuel cap are disposed. Water from rain, melting snow and vehicle washing can accumulate in the chamber. Small amounts of fuel can drip from a fuel-dispensing nozzle during a refueling operation, as the nozzle is removed from the filler tube. The fuel can attract dust and grime, which accumulate over time. During hand washing, it is common for water to be sprayed from a hose or pressure washer into the chamber, in an effort to clean the chamber. Any end closure for the filler tube, including a capless end closure, should withstand direct high-pressure spray from various angles, without compromising the sealing effect of the closure. The accumulation of water in the chamber, from any source, can enter the filler tube, particularly if the cap is removed therefrom for refueling, or at any time if the cap has been lost or not properly and tightly closed on the end of the filler tube.

Vehicle crash-worthiness requires that fuel system structural integrity remain in the event of a crash, including integrity of the tank, filler tube and a closure therefore, so that fuel does not leak and create a fire danger. This can present design challenges in attaching end closure assemblies since the fuel tank is often connected to the frame and the filler tube extends through or near to outer fender bodies that may be highly damaged during a crash.

The present invention is directed to overcoming one or more of the problems identified above by providing a breakaway capless refueling assembly that is simple and intuitive to use, operates in conjunction with common positive sealing inserts, and limits the accumulation of fluids in the housing chamber surrounding the end of the filler tube, while functioning to retain filler tube integrity during a crash.

SUMMARY OF THE INVENTION

The present invention provides a closure mechanism for the end of a fuel system filler tube, which opens and closes as a refueling nozzle is inserted or removed, and which channels away any accumulated liquids in the chamber, withstands direct high-pressure spray, and separates from the PSI in the event of a crash, promoting fuel system integrity.

In one aspect thereof, the invention provides a capless refueling assembly for an automobile fuel system with a filler tube assembly including a filler tube and a positive sealing insert associated with the filler tube. A cover structure is provided for protecting the positive sealing insert. The cover structure includes a housing defining a chamber having a bottom. The bottom defines a hole in substantial alignment with the filler tube. A closure mechanism disposed in the chamber includes an arm pivotally mounted in the chamber and an enlargement on the arm for selectively covering and exposing the hole. A frangible connection secures the cover structure to the filler tube assembly for facilitating separation of the cover structure from the filler tube assembly under pre-established conditions.

In another aspect thereof, the invention provides a capless refueling assembly for receiving fuel from a refueling system. The assembly includes a filler tube for receiving an input of fuel. The filler tube has an end adapted to receive a dispensing nozzle therein. A housing defines a chamber surrounding the filler tube end. The chamber has a hole in substantial alignment with the filler tube. An arm is attached to the chamber about a pivot. An enlargement at an end of the arm selectively covers and uncovers the hole. A first sealing surface in the chamber around the hole and a second sealing surface on the enlargement cooperate to sealingly close the chamber hole.

In yet another aspect thereof, the invention provides a cover structure for an end of a vehicle fuel filler tube adapted to receive a dispensing nozzle of a refueling system. The cover structure includes a first housing part and a second housing part joined together and defining a chamber at the filler tube end. The chamber has a hole in substantial alignment with the filler tube, an arm attached to the chamber about a pivot, and an enlargement at an end of the arm for selectively covering and uncovering the hole. A first sealing surface in the chamber around the hole and a second sealing surface on the enlargement cooperate to sealingly close the chamber hole. The first and second sealing surfaces are urged into sealing engagement.

An advantage of the present invention is providing a closure mechanism for the end of a fuel system filler tube for which the proper use is intuitive, which opens readily in response to the start of a refueling procedure, and which closes automatically upon completion of refueling.

Another advantage of the present invention is providing a refueling assembly with structure for draining liquids away from the filler tube end and out of a chamber surrounding the filler tube end, and which is simple in operation and inexpensive to manufacture and install.

Still another advantage of the present invention is providing a filler tube closure mechanism that connects to a positive sealing insert with breakaway connections so that a fuel tank and filler tube with sealing insert therein can withstand crashes without spilling fuel.

Yet another advantage of the present invention is providing a capless refueling assembly that guides a refueling nozzle through the PSI without damage to the sealing portions of the PSI, and provides a locking lip to hold a refueling nozzle during a refueling process.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description, or illustrated in the drawings. The invention is capable of other embodiments, and of being practiced or being carried out in various ways. Also, it is understood that the phraseology and terminology used herein are for the purpose of description and should not be regarded as limiting. The uses of "including" and "comprising", and variations of each herein are meant to encompass the items listed thereafter, and equivalents thereof, as well as additional items and equivalents thereof.

DETAILED DESCRIPTION OF THE PREFERRED EMBODIMENT

Figure 1:
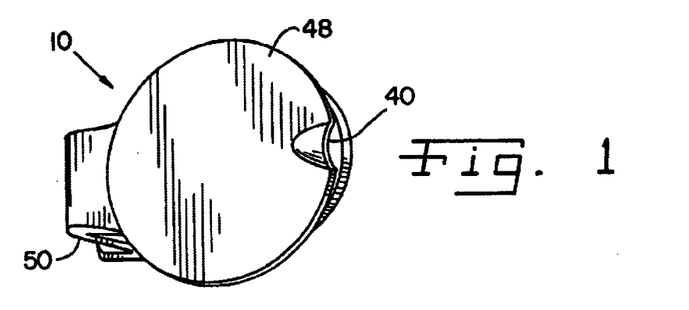
FIG. 1 is a perspective view of a capless refueling assembly in accordance with the present invention, shown in a closed position.
Figure 3:
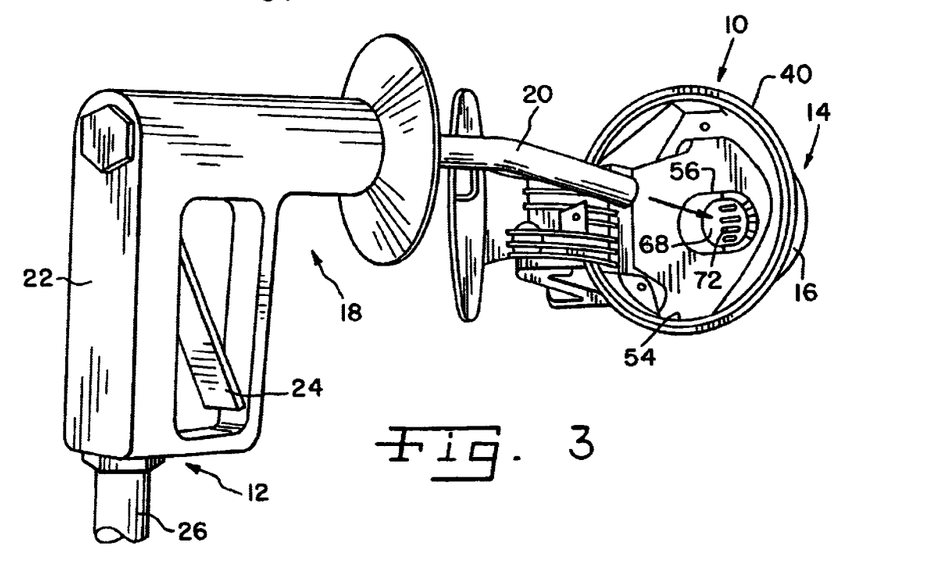
FIG. 3 is a perspective view of the capless refueling assembly, and a refueling nozzle.

Referring now more specifically to the drawings and to FIG. 1 in particular, numeral 10 designates a capless refueling assembly of the present invention. Assembly 10, preferably, is made of plastic, but also may be made of other materials, such as metal. Assembly 10 is particularly advantageous when provided on the fuel system of a motor vehicle, such as a car, truck or the like, and may be adapted for use with gasoline, diesel fuel or other fuels dispensed from a refueling system 12 (FIG. 3). Refueling system 12 may be a conventional gasoline or diesel fuel pump at a refueling station.

Assembly 10 includes a filler tube assembly 14 having a filler tube 16 adapted and sized for receiving therein a dispensing nozzle 18 of refueling system 12. Nozzle 18 includes a pipe 20, through which fuel is dispensed from a gun 22 having a flow control trigger 24. Nozzle 18 is connected in fluid flow relationship via a hose 26 to a dispensing pump (not shown). In known manner, fuel is dispensed from nozzle 18 through pipe 20 into filler tube 16, and flows through filler tube 16 to a fuel holding tank (not shown).

Figure 4:
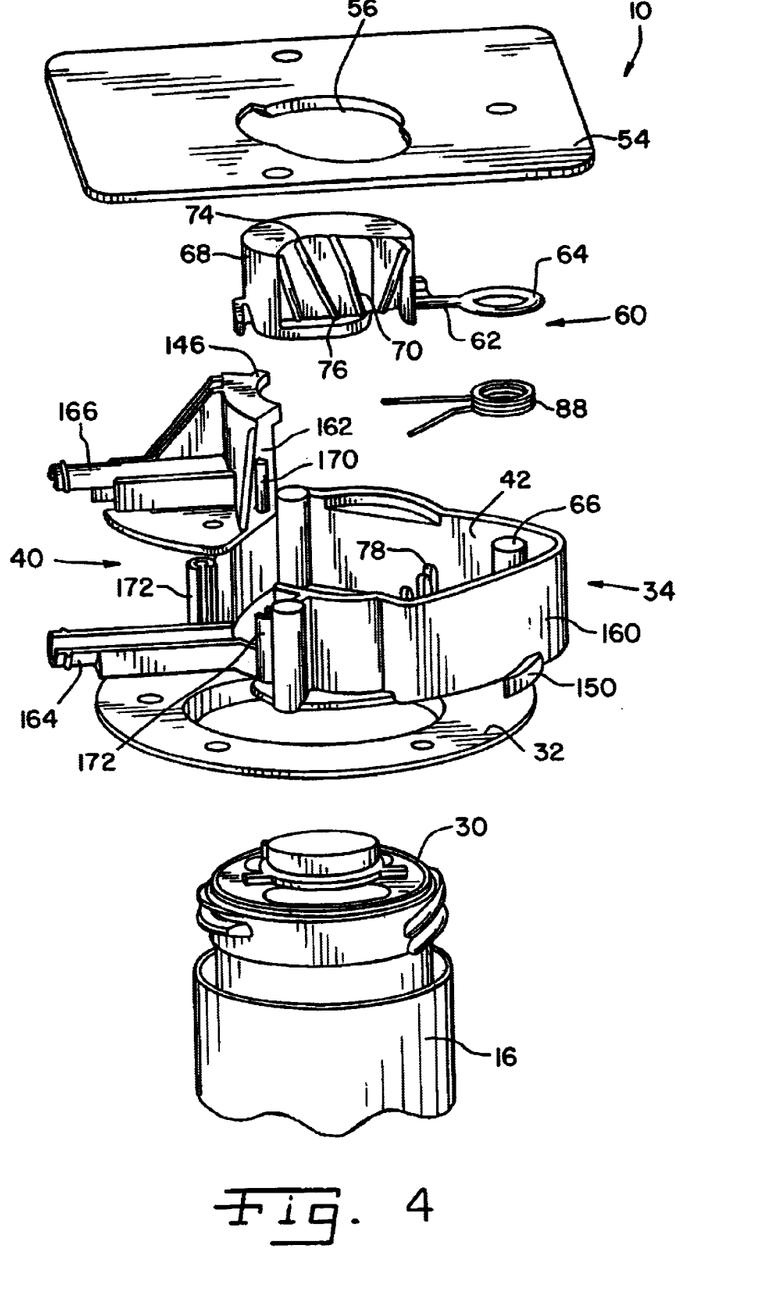
FIG. 4 is an exploded view of the capless refueling assembly.

Referring now to FIG. 4, a positive sealing insert 30 is provided in filler tube 16, to vent excess vapor pressure in filler tube 16, and to provide a barrier against fuel sloshing in filler tube 16 from the fuel tank (not shown). Positive sealing insert 30 can be of any acceptable design, known to those skilled in the art, and will be described in greater detail herein only to the extent necessary to describe the functional relationship between the positive sealing insert and assembly 10 of the present invention.

Assembly 10 of the present invention replaces a common fuel cap used for closing filler tube 16. A flange 32 is connected securely to filler tube 16 and/or positive sealing insert 30, and a cover structure 34 is connected to flange 32 by one or more frangible connections 36, 38. Cover structure 34 establishes a barrier in front of positive sealing insert 30, to keep dirt, moisture and other contaminants away from positive sealing insert 30. Cover structure 34 is connected to flange 32, but functions independently of positive sealing insert 30. Therefore, cover structure 34 can be used as a replacement for a fuel cap, and can work equally well with various types of positive sealing inserts 30.

Figure 7:
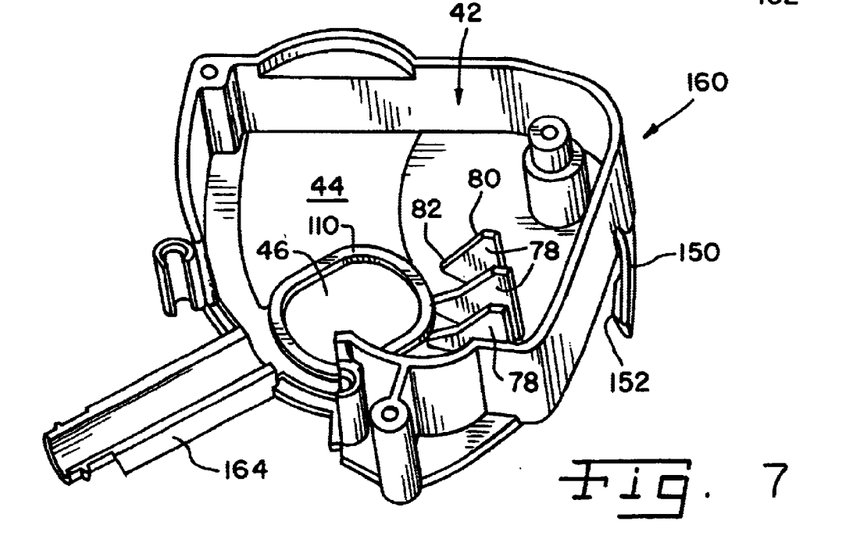
FIG. 7 is a perspective view of a housing part in the capless refueling assembly.
Figure 8:
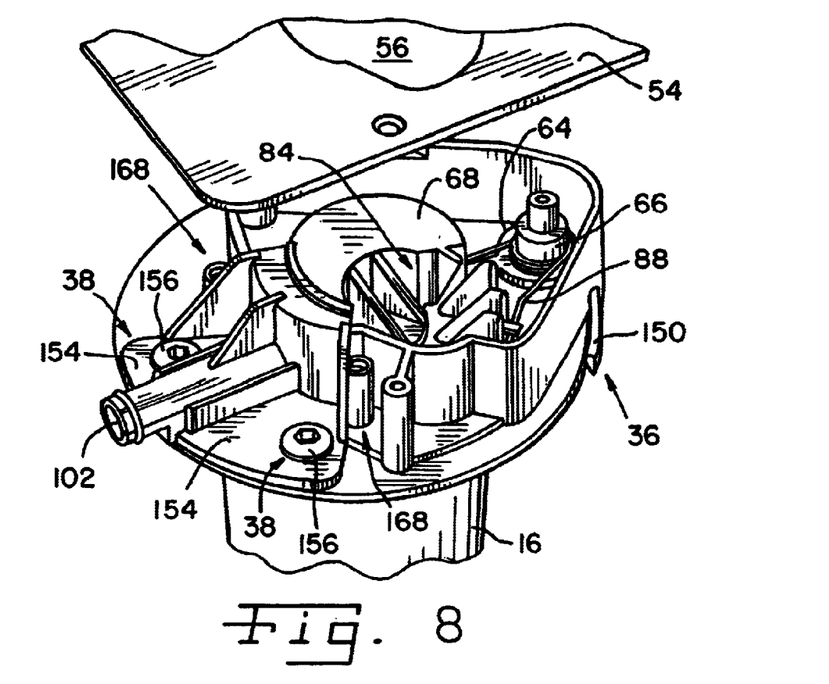
FIG. 8 is a perspective view of the capless refueling assembly.
Figure 9:
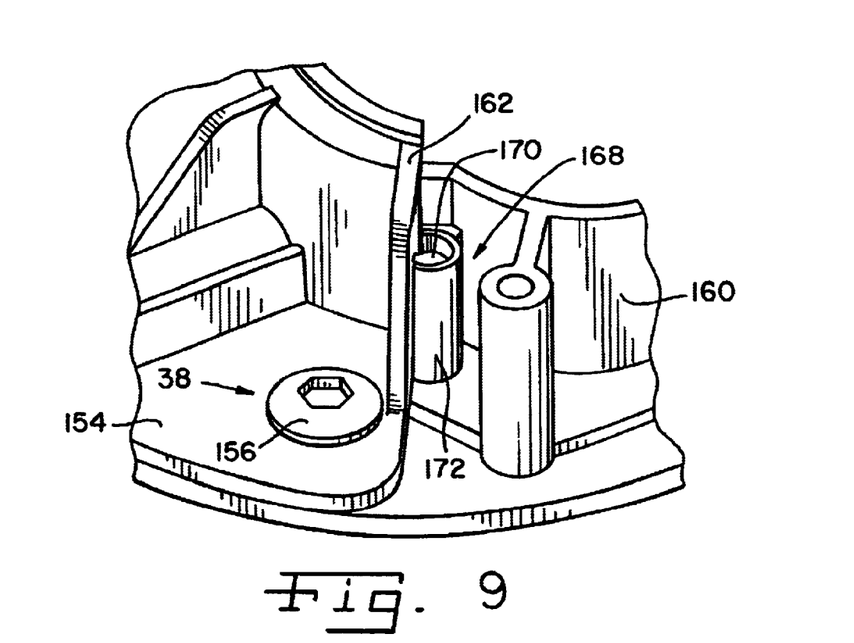
FIG. 9 is an enlarged fragmentary view of first and second housing parts in the capless refueling assembly.

Cover structure 34 includes a housing 40 defining a chamber 42 in which an end of filler tube 16 is exposed. Chamber 42 has a bottom 44 (FIG. 7) that defines a hole 46 in substantial alignment with filler tube 16, such that pipe 20 can be inserted through hole 46 into filler tube 16.

Figure 2:
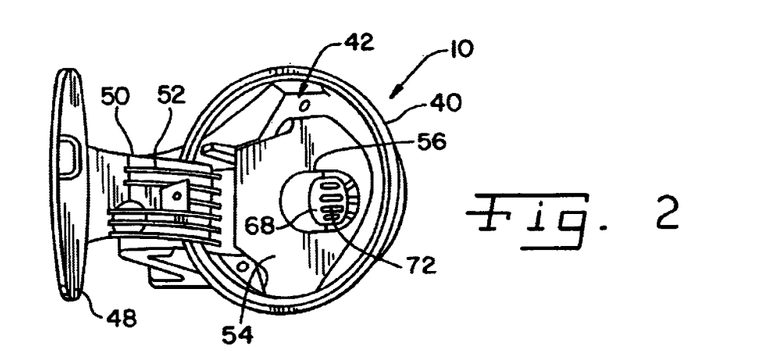
FIG. 2 is a perspective view of the capless refueling assembly, shown in an open position in preparation for refueling.

Access to housing 40 can be provided through a door 48, connected relative to housing 40 by a hinge 50 (FIG. 2). Door 48 can be swung on hinge 50, to alternatively and selectively expose or cover chamber 42. A door spring 52 is connected operatively with hinge 50, in known manner, to bias door 48 toward a closed position, as shown in FIG. 1.

Figures 5, 6:
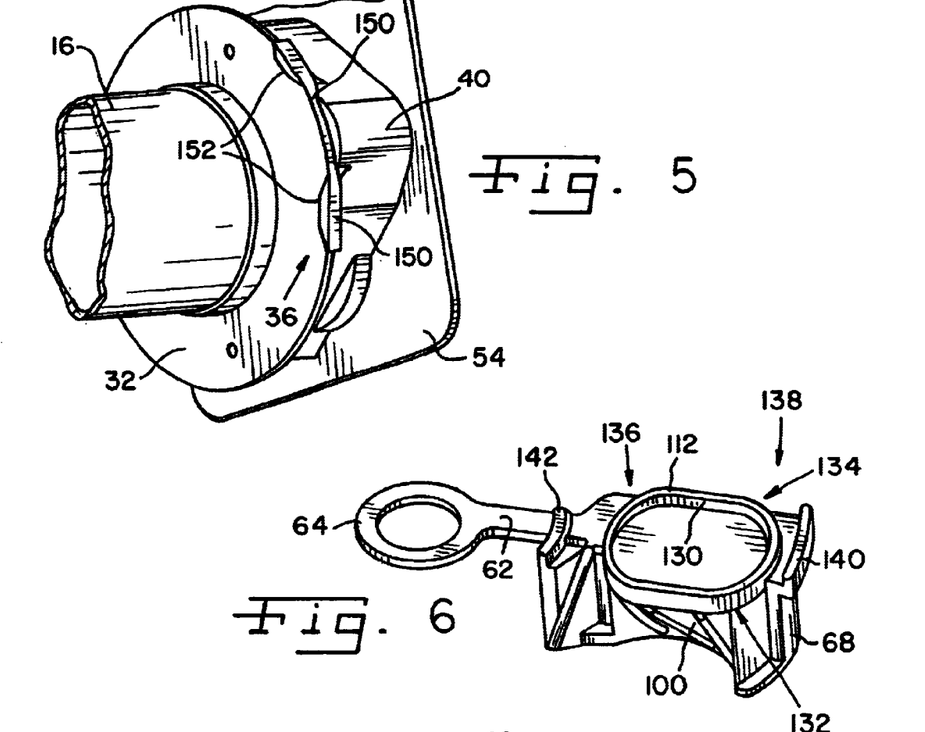
FIG. 5 is a perspective view of the capless refueling assembly, shown from a back side thereof.
FIG. 6 is a perspective view of the bottom of a closure mechanism in the capless refueling assembly.

A plate 54 can be provided in a lower portion of chamber 42 as illustrated in FIG. 2, or as cover to chamber 42 as illustrated in FIGS. 4 and 5 with an outer entrance (not shown) provided by the automobile body in which refueling assembly 10 is installed. Plate 54 defines an opening 56 that, in appearance and position, invites the insertion of pipe 20 therethrough. A closure mechanism 60 is positioned behind plate 54, between plate 54 and bottom 44.

Closure mechanism 60 includes a closure arm 62 having an annular end 64 thereof connected to housing 40 via a pivot 66, about which end 64 can rotate. An enlargement 68 is provided on closure arm 62, generally opposite pivot 66. Enlargement 68 is moved between opened and closed positions relative to hole 46 by rotation of arm 62 about pivot 66.

Enlargement 68 includes a series of ribs 72, ribs 72 angling downwardly from an outer edge 74 of enlargement 68 toward an inner edge 76 thereof, adjacent stop 70. A series of stationary ribs 78 are provided on bottom 44, angling downwardly from an outer edge 80 of stop 70 toward an inner edge 82 thereof, adjacent hole 46. As associated in chamber 42 of assembly 10, outer edges 74 and 80 are more distant from each other than are inner edges 76 and 82, which are adjacent each other when enlargement 68 is in a closed position. Ribs 72 and 78 thereby angle downwardly toward each other, and cooperatively form a depression 84 that is exposed through opening 56 defined in plate 54.

A biasing means, such as a spring 88, is connected between housing 40 and closure arm 62, in such a way as to urge enlargement 68 to a closed position. Spring 88 applies sufficient force to arm 62 to ensure that enlargement 68 is covering hole 46 under normal operation and use conditions for a vehicle (not shown) in which capless refueling assembly 10 is used.

Assembly 10 is provided with drain means for removing liquids that accumulate in chamber 42. Ribs 72 of enlargement 68 are separated by through channels 100 formed in enlargement 68. Channels 100 provide a conduit by which fluid can be drained away from near and around end 16 of filler tube 16. More or fewer channels 100 can be used. Channels 100 provide a path for the removal of liquid from depression 84. Housing 40 and bottom 44 thereof are shaped and positioned to drain liquids in chamber 42 toward a drain 102 formed in housing 40. Drain 102 is in fluid flow communication between chamber 42 and the exterior of chamber 42. Thus, any liquids in housing 40 are drained from housing 40 through drain 102.

To provide an effective seal preventing moisture and contaminants from reaching positive sealing insert 30, chamber 42 and enlargement 68 are provided with cooperating first and second sealing surfaces 110 and 112, respectively. First sealing surface 110 is provided as an upper surface of a rim 114 surrounding hole 46. Rim 114 establishes an elevated barrier around hole 46 so that moisture or other contaminants on bottom 44 can not flow easily into filler tube 16 and positive sealing insert 30, but instead are drained away, as will be described more fully hereafter. Rim 114 and first sealing surface 110 thereon are shaped to allow enlargement 68 to slide thereover, and to provide an effective sealing relationship to aligned first and second sealing surfaces 110 and 112. With respect to the direction from which enlargement 68 advances toward rim 114, rim 114 has an approach side 116 and a far side 118 that flow integrally into each other along ends 120 and 122. Approach side 116 is angled from an outermost edge 124 thereof to an innermost edge 126 thereof. Preferably, approach side 116 is a planar slope angled at about five degrees. Far side 118 is formed as a forty-five degree chamfer. Ends 120 and 122 are formed as smooth transitions between the planar slope of approach side 116 and the chamfer of far side 118.

Enlargement 68 includes a ring 130 having second sealing surface 112 as an outermost face thereof. Ring 130 has a leading side 132 and a trailing side 134 that flow integrally into each other along ring ends 136 and 138. Leading side 132 is formed as a cooperating chamfer to far side 118, trailing side 134 is formed as a cooperating planar slope to approach side 116 and ring ends 136 and 138 are formed as transitions therebetween cooperating with ends 120 and 122 such that a water tight seal is formed between first and second sealing surfaces 110 and 112.

To prevent second sealing surface 112 from becoming worn or marred by contact with bottom 44, skids 140 and 142 are provided on closure mechanism 60, and slide along bottom 44 as closure mechanism 60 moves between open and closed positions. Skids 140 and 142 hold second sealing surface 112 in spaced relation to bottom 44. As second sealing surface 112 advances over first sealing surface 110, just prior to reaching the aligned sealing position of ring 130 relative to rim 114, the sloping surfaces cause enlargement 68 to be lifted slightly, raising skids 140 and 142 off of bottom 44. A ramp 144 along an upper edge of enlargement 68 slides under a locking lip 146 from housing 40, and skid 142 interacts with a hold-down member 148, thereby wedging enlargement 68 in proper sealing position.

Cover structure 34 may be connected to or closely associated with fenders or other outer body components of an automobile. To prevent fuel spillage during a crash, the fuel tank, filler tube 16 and positive sealing insert 30 should remain intact, often securely connected to the automobile frame or axle subassembly. Frangible connections 36, 38 provide a clean separation under the extreme conditions that can occur during a crash. Cover structure 34 breaks away from filler tube 16 and positive sealing insert 30 by the fracture of frangible connections 36, 38. One or more first frangible connection 36 may be provided as an assist in the assembly and positioning of housing 40 on flange 32. Each first connection 36 defines a hook means that includes a frangible arm 150 extending outwardly from housing 40, near the edge of flange 32, to engage flange 32 via a tab 152 at the end of arm 150 positioned on an opposite side of flange 32 from housing 40. During assembly, initial positioning of housing 40 on flange 32 is achieved by engaging the one or more arms 150 with flange 32.

Second frangible connection 38 includes a frangible lip or lips 154 of housing 40 that are positioned against flange 32, and secured thereto by a fastener 156 such as a screw, bolt, rivet or the like.

During a catastrophic event, frangible arms 150 and frangible lips 154 fracture. Any fasteners 156, along with a small surrounding portion of frangible lips 154 remain with flange 32. Housing 40 can thereby separate from flange 32 and filler tube 16.

For manufacturing ease, housing 40 can be provided in two or more parts, including a first housing part 160 and a second housing part 162. Drain 102 can be provided as a first drain part 164 and a second drain part 166 in first and second housing parts 160 and 162, respectively. One or more interlocks 168 are provided to hold together first and second housing parts 160 and 162. Interlocks 168 are cooperating, engaging structures, such as a rounded piece 170 held in a partial cylinder piece 172. A locking lip 174 is provided on one of the housing parts 160, 162 and is positioned to engage an annular feature known to be provided on refueling structures such as nozzle 18, to hold the nozzle in proper position during refueling.

Figure 10:
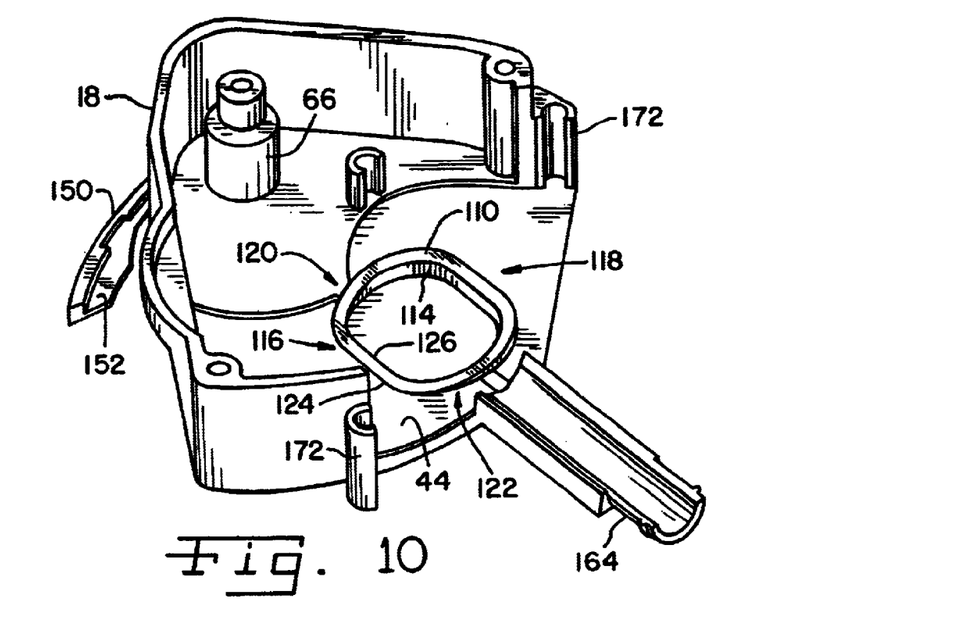
FIG. 10 is a perspective view of a modified form of the first housing part of the present invention.
Figure 11:
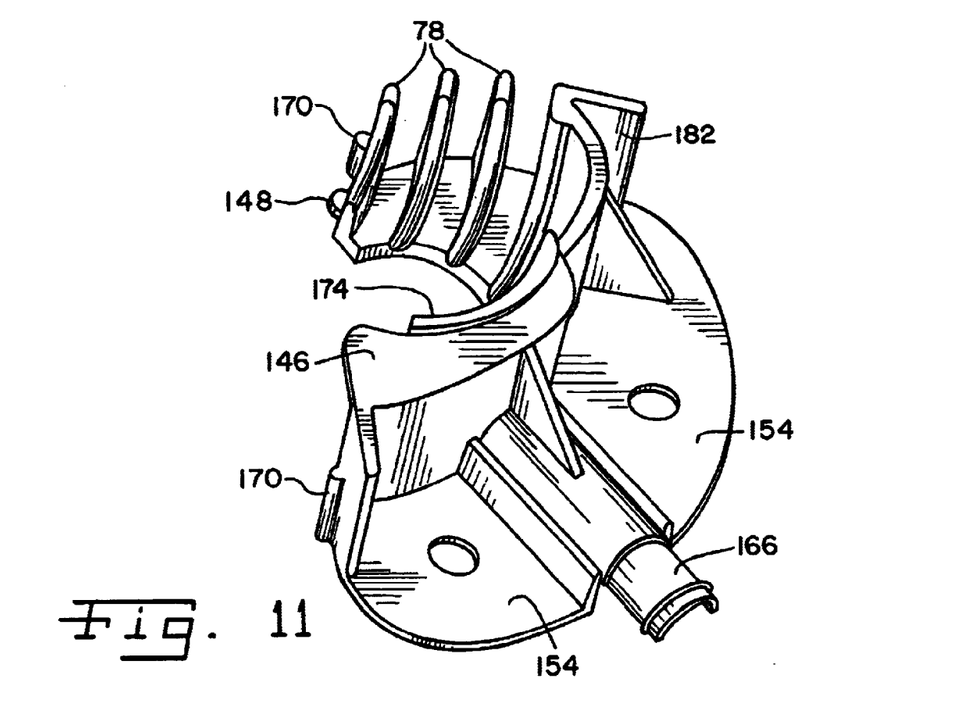
FIG. 11 is a perspective view of a modified form of the second housing part of the present invention.
Figure 12:
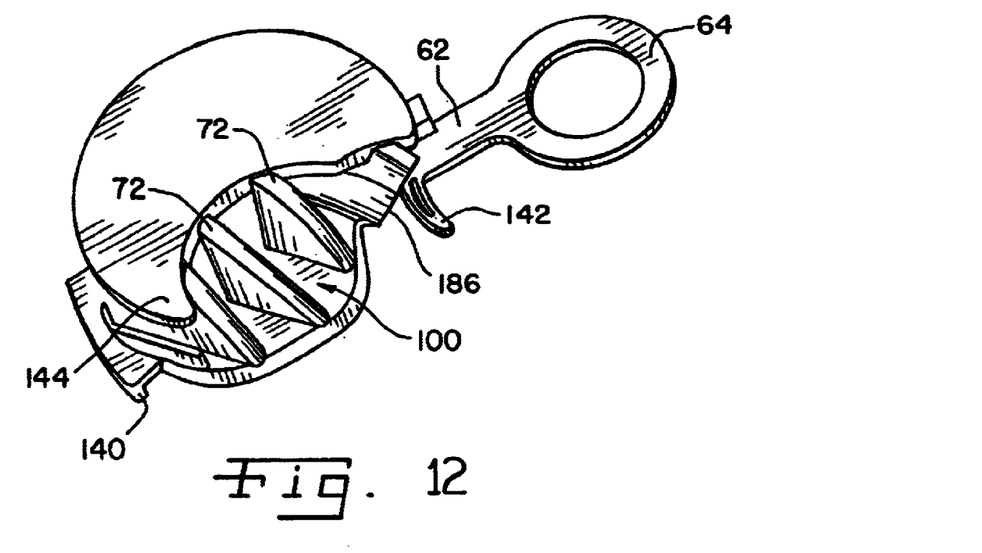
FIG. 12 is a perspective view of the arm and enlargement of the closure mechanism of the present invention.

The present invention can be modified to accommodate different automobile body styles or other configuration requirements, as well as changes for manufacturing efficiency. For example, FIGS. 10 and 11 illustrate modified first and second housing parts 180 and 182, respectively. Stationary ribs 78 are provided in second housing part 182. Other examples of possible modifications include varying the position of pivot 66, and therefore the direction that enlargement 68 swings in moving between opened and closed positions.

Figure 13:
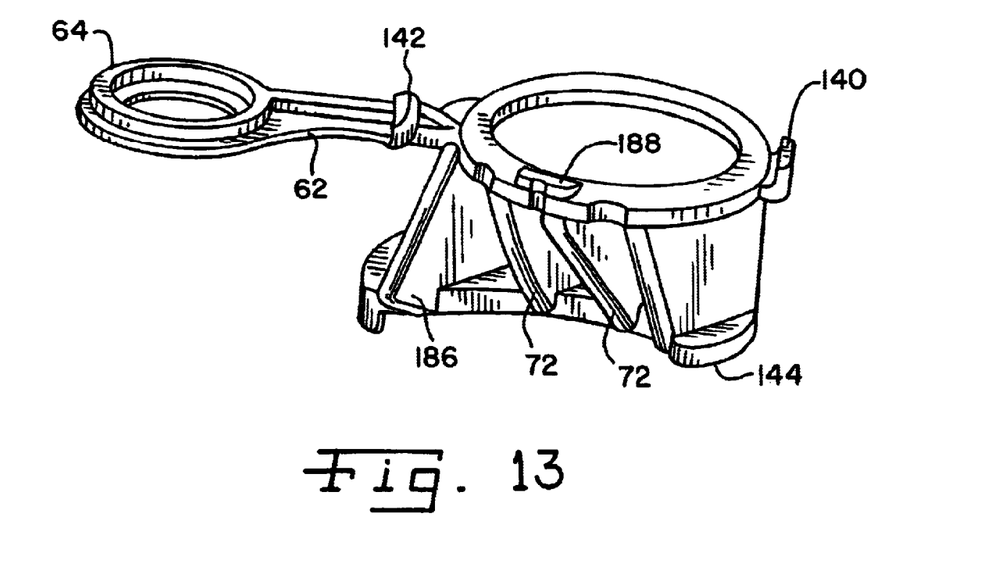
FIG. 13 is a perspective view of a modified closure mechanism of the present invention.

An end rib 186 can be used as a physical stop for preventing over advancement of closure mechanism 60 by abutting a fixture in housing 40. A boss 88 on the bottom of enlargement 68 (FIG. 13) prevents entanglement of a spring or ring often found on pipe 20 with an edge of enlargement 68.

Figure 14:
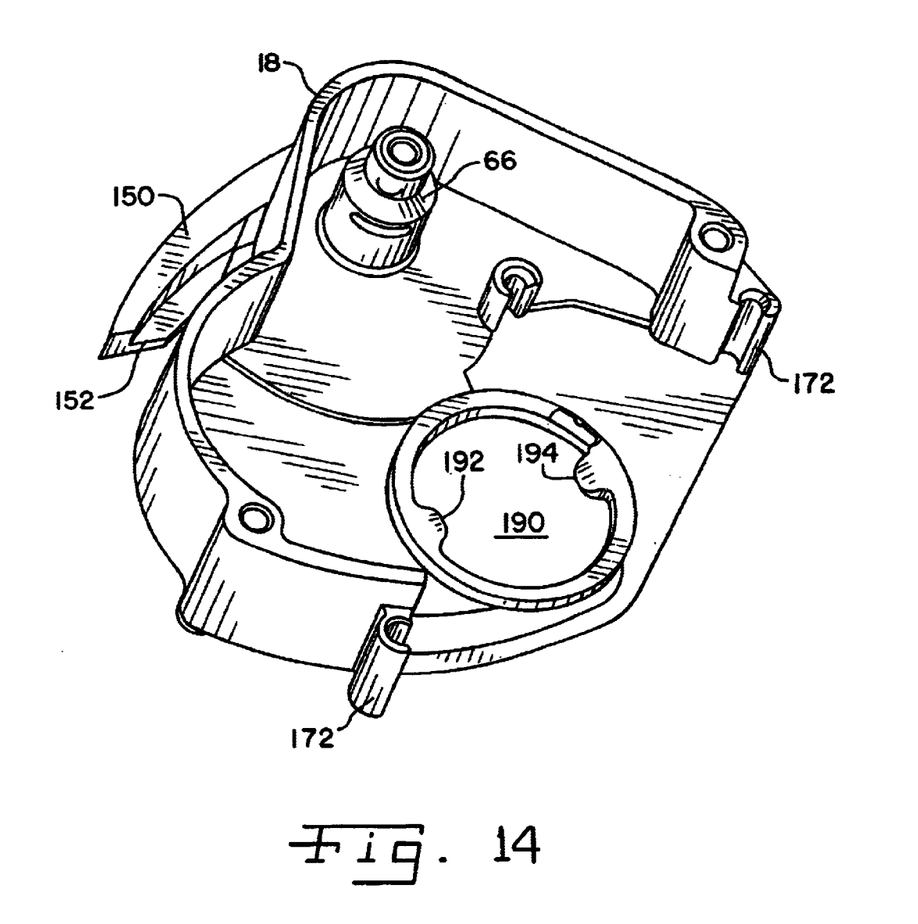
FIG. 14 is a perspective view of a further modified housing in accordance with the present invention.

A further modification of housing 40 is shown in FIG. 14. A hole 190 is provided with inwardly directed, opposed protrusions 192 and 194. The distance between protrusions 192 and 194 is sufficient to receive pipe 20 therebetween. The opening around pipe 20 outwardly of the inward edges of protrusions 192 and 194 provides vent space sufficient to meet requirements for venting to eliminate back pressure in the event of failed nozzle-shutoff during refueling.

During assembly, positive sealing insert 30 is secured in filler tube 16, and flange 32 is attached to filler tube 16 by known means. Housing 40 is readily and accurately positioned on flange 32 by hooking the one or more arms 150 over the edge of flange 32, with tabs 152 on an opposite side of flange 32 from housing 40. Housing 40 can be rotated as necessary to align holes (not shown) for inserting fasteners 156 securing frangible lip 154 to flange 32. Alternatively, flange 32 can be provided with a peripheral shape selected together with the shape of housing 40 and the positions of arms 150 such that housing 40 can be placed on flange 32 only in the proper position for insertion of fasteners 156.

In the day to day use and operation of capless refueling assembly 10, a refueling procedure is commenced by opening door 48. Door 48 is moved from the closed position shown in FIG. 1 to the open position shown in FIG. 2, whereby chamber 42 is exposed. In opening door 48, spring force from door spring 52 is overcome as door 48 is rotated about hinge 50.

Depression 84 is visible through opening 56 of the otherwise continuous surface of plate 54. A person performing the refueling operation instinctively knows to push pipe 20 through opening 56 and against ribs 72 and 78. The otherwise continuous surface of plate 54 presents no other options for the insertion of pipe 20 from nozzle 18. Therefore, use of capless refueling assembly 10 is instinctive and intuitive, requiring no individual training or instruction.

In the fully closed position, ramp 144 is wedged beneath locking lip 146, and enlargement 68 is positioned over hole 46 with second sealing surface 112 seated on first sealing surface 110. Initial movement of closure mechanism 60 unseats second sealing surface 112 from first sealing surface 110, and, with only minimal movement of closure mechanism 60, skids 140 and 142 are lowered onto bottom 44. Second sealing surface 112 is thereby supported in spaced relation to bottom 44 so that dirt or other contaminants on floor 44 will not mar or embed in or against second sealing surface 112.

As pipe 20 is forced against downwardly sloping ribs 72 and 78, enlargement 68 is rotated about pivot 66 and moved to an open position. Only minimal resistance is created as skids 140 and 142 slide along bottom 44, so that the resistance to the insertion of pipe 20 is primarily only that required to overcome the closing force exerted by spring 88. The smooth, sloping surfaces of ribs 72 and 78 provide a smooth, consistent resistance as pipe 20 is inserted, so that movement of enlargement 68 is smooth and steady, with a consistent feel.

The end of pipe 20 is directed downwardly toward filler tube 16 and positive sealing insert 30 therein. The shapes and positions of ribs 72 and 78 are such as to properly align pipe 20 of nozzle 18 with filler tube 16. Depending on the type of fuel to be used, the size of pipe 20 and the general orientation, configuration and sizes of ribs 72 and 78, more or fewer ribs can be used, including additional partial ribs to accurately direct pipe 20 into and out of positive sealing insert 30.

After pipe 20 is properly inserted in filler tube 16, refueling continues according to normal practices, with trigger 24 being depressed to enable a flow of fuel through hose 26 and pipe 20. Fuel is thereby deposited into the fuel tank (not shown) through filler tube 16.

Upon completion of the refueling procedure, trigger 24 is released to terminate the flow of fuel into filler tube 16, and pipe 20 is withdrawn from filler tube 16. Spring 88 immediately urges enlargement 68 toward the closed position. Enlargement 68 moves readily to the closed position under the influence of spring 88, with only minimal sliding resistance created by skids 140 and 142 moving across bottom 44. During the final stages of closing, as ring 130 moves over and along rim 114, enlargement 68 is elevated slightly, raising skids 140 and 142 off bottom 44. With further minimal advancement of enlargement 68, ramp 144 slides beneath locking lip 146, causing downward force on enlargement 68 to seat second sealing surface 112 against first sealing surface 110. Filler tube 16 is thereby effectively closed and sealed against the ingress of dirt, contaminants and fluids such as water.

The final movements just described for enlargement 68, to first raise skids 140 and 142 off bottom 44 and then to seat second sealing surface 112 against first sealing surface 110 are accomplished with only minimal movement of second sealing surface 112 against first sealing surface 110. Skids 140 and 142 otherwise fully support the movement of enlargement 68.

Fuel spillage, or the accumulation of water, sleet, snow or rain in chamber 42, can be handled effectively with capless refueling assembly 10 according to the present invention. Any liquid accumulating in chamber 42 is quickly discharged via drain 102. Channels 100 direct any liquids in the immediate area of filler tube 16 toward the more open regions of chamber 42, which is shaped and positioned to direct all liquid to flow toward drain 102. Thus, accidental accumulations are evacuated, as are intentional accumulations from water spray during washing activities. Further, ribs 72 with channels 100 therebetween divert even high pressure spray such as from washing apparatus, and the potential for accidental moving of enlargement 68 by high pressure spray is reduced.

As can be seen from the above description, both opening and closing of filler tube 16 are automatic. Positive sealing insert 30 is protected against contamination and fouling at all times. Covering or closing filler tube 16 can not be forgotten, since it is automatic. Refueling procedures are simplified in that cumbersome tethered filler tube caps are eliminated. Advantageously, disconnected parts are eliminated, avoiding the potential for loss or misplacement of a filler tube cap. Liquids accidentally or intentionally deposited in chamber 42 are channeled away from end 16 and out of chamber 42.

In the event of a crash in which the physical relationship between cover structure 34 and filler tube 14 are altered, to prevent rupture of filler tube 14 downstream from positive sealing insert 30, cover structure 34 readily separates from filler tube assembly 14. Frangible lip 154 fractures, allowing fasteners 156 to remain with flange 32 without any continued connection to housing 40. Frangible arms 150 or tabs 152 also fracture. All physical connections between cover structure 34 and filler tube assembly 14 are terminated, thereby allowing filler tube 14 with positive sealing insert 30 therein to remain intact and reduce the possibility that fuel will be spilled. Cover structure 34, which may be connected to fenders or other body components, can move separately and independently from filler tube assembly 14, which often is shielded and protected along with the fuel tank to which it is connected.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A capless refueling assembly for an automobile fuel system, said assembly comprising:
    a filler tube assembly including a filler tube, and a positive sealing insert associated with said filler tube;
    a cover structure for protecting said positive sealing insert, said cover structure including;
        a housing defining a chamber having a bottom, said bottom defining a hole in substantial alignment with said filler tube;
        a closure mechanism disposed in said chamber, including an arm pivotally mounted in said chamber, and an enlargement on said arm for selectively covering and exposing said hole said enlargement being movable between open and closed positions relative to said hole by movement of said arm in a direction that is away from said hole; and
    a frangible connection securing said cover structure to said filler tube assembly for facilitating separation of said cover structure from said filler tube assembly under pre-established conditions.

2. The capless refueling assembly of claim 1, said frangible connection including frangible hook means between said filler tube assembly and said cover structure.

3. The capless refueling assembly of claim 1, said filler tube assembly including a flange, and said cover structure including frangible arms from said housing engaging said flange.

4. The capless refueling assembly of claim 3, said arms having tabs disposed on a side of said flange opposite from said housing.

5. The capless refueling assembly of claim 3, said cover structure including a frangible lip and fasteners securing said lip to said flange.

6. The capless refueling assembly of claim 5, said housing including a first housing part and a second housing part, and at least one interlock securing together said first and second housing parts.

7. The capless refueling assembly of claim 1, said housing including a first housing part and a second housing part, and at least one interlock securing together said first and second housing parts.

8. The capless refueling assembly of claim 7, said cover structure including a frangible lip and fasteners securing said lip to said filler tube assembly.

9. The capless refueling assembly of claim 1, said cover structure including a frangible lip and fasteners securing said lip to said filler tube assembly.

10. The capless refueling assembly of claim 1, said housing including a rim surrounding said hole, said rim having a first sealing surface, and said enlargement having a corresponding second sealing surface for seating on said first sealing surface of said rim.

11. The capless refueling assembly of claim 10, said first sealing surface being disposed on said rim elevated from said bottom.

12. The capless refueling assembly of claim 10, said rim having an approach side and a far side, said enlargement adapted and arranged in said chamber to advance onto said rim from said approach side, and said rim being angled on said approach side and chamfered on said far side.

13. The capless refueling assembly of claim 10, said closure mechanism having skids for sliding along said bottom.

14. The capless refueling assembly of claim 10, said housing including a locking lip, and said closure mechanism including a ramp slidable under said locking lip for seating said second sealing surface against said first sealing surface.

15. The capless refueling assembly of claim 10, said enlargement having a ring, and said second sealing surface disposed on said ring.

16. The capless refueling assembly of claim 15, said rim having an approach side and a far side, said enlargement adapted and arranged in said chamber to advance onto said rim from said approach side, and said rim being angled on said approach side and chamfered on said far side.

17. The capless refueling assembly of claim 16, said housing including a locking lip, and said closure mechanism including a ramp slidable under said locking lip for seating said second sealing surface against said first sealing surface.

18. The capless refueling assembly of claim 17, said closure mechanism having skids for sliding along said bottom.

19. A capless refueling assembly for receiving fuel from a refueling system, said assembly comprising:
- a filler tube for receiving an input of fuel, said filler tube having an end adapted to receive a dispensing nozzle therein;
- a housing defining a chamber surrounding said filler tube end, said chamber having a hole in substantial alignment with said filler tube;
- an arm attached to said chamber about a pivot;
- an enlargement at an end of said arm for selectively covering and uncovering said hole;
- a first sealing surface in said chamber around said hole; and
- a second sealing surface on said enlargement so as to be movable with said enlargement, said second sealing surface cooperating with said first sealing surface to sealingly close said chamber hole when said enlargement is slid over said chamber hole.

20. The capless refueling assembly of claim 19, said enlargement having a ring, and said second sealing surface comprising a surface of said ring.

21. The capless refueling assembly of claim 20, said housing having a rim surrounding said hole, and said first sealing surface comprising a surface of said rim.

22. The capless refueling assembly of claim 21, at least one of said arm and said enlargement including a skid for supporting said enlargement while moving in said chamber.

23. The capless refueling assembly of claim 22, said housing including a locking lip arranged in said chamber to engage said enlargement and urge said sealing surfaces together.

24. The capless refueling assembly of claim 19, said housing including a drain tube in fluid communication with said chamber.

25. The capless refueling assembly of claim 24, said housing including a first housing part and a second housing part secured together, and said drain tube having a first drain tube part in said first housing part and a second drain tube part in said second housing part.

26. The capless refueling assembly of claim 19, including a positive sealing insert in said filler tube.

27. The capless refueling assembly of claim 26, said chamber including a rim surrounding said hole, and said first sealing surface comprising a surface of said rim.

28. The capless refueling assembly of claim 27, said sealing surface having an angled portion on one side of said hole and a chamfered portion on an opposite side of said hole.

29. The capless refueling assembly of claim 19, said housing including a locking lip arranged in said chamber to engage said enlargement and urge said sealing surfaces into sealing engagement.

30. A cover structure for an end of a vehicle fuel filler tube adapted to receive a dispensing nozzle of a refueling system, said cover structure comprising:
- a first housing part and a second housing part joined together and defining a chamber at the filler tube end, said chamber having a hole in substantial alignment with said filler tube;
- an arm attached to said chamber about a pivot;
- an enlargement at an end of said arm for selectively covering and uncovering said hole by slidingly moving said enlargement over a top portion of said hole;
- a first sealing surface in said chamber around said hole; and
- a second sealing surface on said enlargement cooperating with said first sealing surface to sealingly close said chamber hole; and
- means urging said first and second sealing surfaces into sealing engagement.

31. The cover structure of claim 30, said first and second housing parts having interlocks securing together said housing parts.

32. The cover structure of claim 30, said enlargement and at least one of said housing parts having ribs thereon, and said ribs on each angling downwardly toward said ribs on the other.

33. The cover structure of claim 30, including a drain for evacuating fluid from said chamber.

34. The cover structure of claim 33, said drain including a first drain part in said first housing part, and a second drain part in said second housing part.

35. The cover structure of claim 30, at least one of said first housing part and said second housing part having a frangible lip.

36. The cover structure of claim 30, at least one of said first housing part and said second housing part having a frangible arm.

* * * * *